United States Patent Office 3,477,516
Patented Nov. 11, 1969

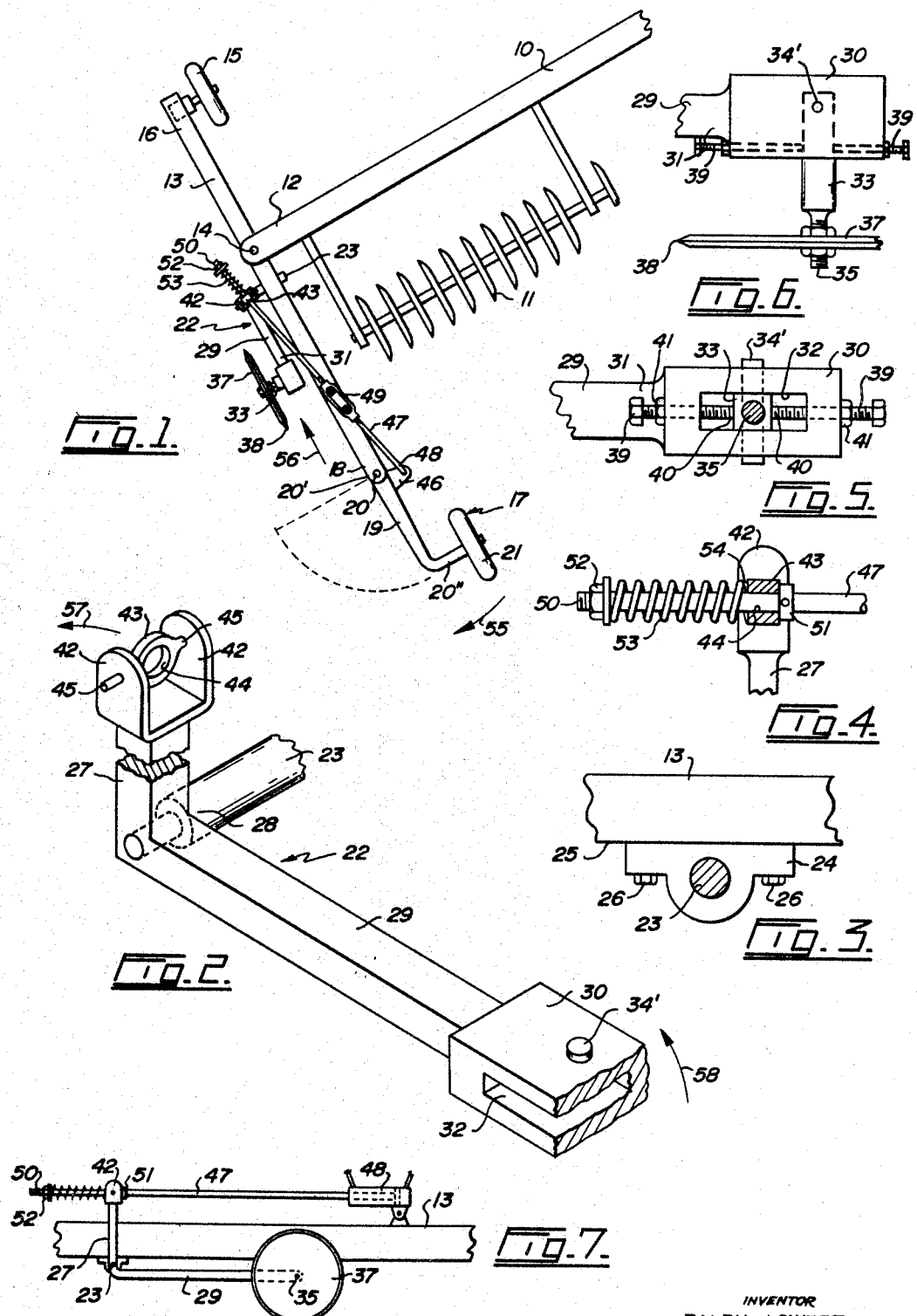

3,477,516
ADJUSTABLE STABILIZING DISC ASSEMBLY FOR DISC CULTIVATORS AND THE LIKE
Ralph W. Sweet, Forgan, Saskatchewan, Canada
Filed Dec. 17, 1965, Ser. No. 514,459
Int. Cl. A01b 49/02, 5/04
U.S. Cl. 172—184                                5 Claims

ABSTRACT OF THE DISCLOSURE

A diagonal frame drawing a gang of discs and having a rudder beam pivoted to one end thereof, the rear end of the rudder beam having a rudder wheel assembly pivoted thereto. A stabilizing disc is mounted at one side of the rudder beam for raising and lowering movement in a plane parallel to the rudder beam, and linkage operatively connects the rudder wheel assembly to the stabilizing disc for raising and lowering the same.

---

This invention relates to new and useful improvements in adjustable rear wheels for added stability in disc cultivators and the like.

Present day disc cultivators and the like normally comprise either a single or articulated unit which may be as much as 30 ft. in width. These discers normally include a pivoted rudder beam upon the trailing end thereof which is adjustable in relation to the main frame.

Rubber wheel tires are mounted on the trailing end of the rudder beam or both on the loading and trailing ends of the rudder beam, the rear wheel acting as a furrow wheel and maintaining the draft of the implement while in use.

Such implements are drawn at an angle to the direction of travel and must maintain this chosen angle in order to obtain proper penetration and movement of the soil sideways by the discs.

However, during the course of operation of these machines, conditions sometimes occur whereby no amount of manual adjustment normally present on conventional discers or disc harrows, can supply the correct tracking of the machine.

For example, when relatively loose soil conditions are encountered, the discer must be worked at a relatively wide angle in order to prevent same from plugging from trash and in order to obtain and maintain the necessary shallow cut desired by the operator under these conditions. It is found that the rudder wheel is depended upon entirely to compensate for what is known as "tail back" under these conditions.

As the wheels must also be set to control the side movement of hillsides and the like, it is found that normally they are adjusted for only slight toe-out. Also the rudder wheel is working in loose soil and under these conditions is provided with very poor footing so that the machine tends to slide sideways down the hill.

I have overcome these disadvantages by providing an adjustable ground engaging stabilizing disc or coulter situated upon the rudder beam intermediate the ends thereof. This disc which is relatively thin and edge sharpened can be made to bite into the soil at a depth greater than the furrow thus giving a firm anchor for the machine and maintaining the desired angle of draft and preventing side slip upon the hills.

However, it is desirable to lift this disc clear of the ground when turning and when transporting the device and although various means can be provided to raise and lower this stabilizer disc with relation to the rudder beam, I have found it advantageous to supply linkage between this stabilizer disc and the rear rudder wheel so that when the machine is turned for example, to left, the turning of the rear rudder wheel automatically through approximately 90°, operates the linkage to lift the stabilizer disc clear of the soil.

By the same token when the machine is straightened up after the turn has been accomplished, the linkage permits the stabilizing disc to lower and the weight of the machine causes the desired penetration thereof. If the weight of the machine is not sufficient for this purpose, then the rear rudder beam can be weighted in the conventional manner.

Inasmuch as the rear rudder wheel is substantially at right angles to the rudder beam when the device is in the transport position, the stabilizing disc is lifted clear of the ground under these conditions also.

Due to the fact that conventional machines have a solid but adjustable land wheel in front and a weighted adjustable rear furrow wheel at the rear held by a stop for straight ahead travel, the present device provides excellent stability under varying extreme soil conditions and also under operation upon side hills and the like.

If hardpan soil conditions are encountered, the rear coulter or stabilizer disc will bite into the hardpan due to the narrow width thereof by contrast to the rubber tired rudder wheel normally used on these machines.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept reference being had to the accompanying figures in which:

FIGURE 1 is a fragmentary top plan view of the rear end of a disc cultivator showing the rudder beam and my device situated thereon.

FIGURE 2 is an enlarged fragmentary perspective view of the mounting means for the stabilizing disc.

FIGURE 3 is an enlarged fragmentary side view of the rudder beam showing the bearing support for the device.

FIGURE 4 is an enlarged fragmentary side elevation showing the rod mounting to the top of the actuating arm.

FIGURE 5 is an enlarged end view showing the mounting of the disc to the support arm and the adjustment for the angular relationship.

FIGURE 6 is a fragmentary top plan view showing the mounting of the stabilizing disc to the support arm.

FIGURE 7 is a fragmentary side elevation in reduced scale showing an alternative method of raising and lowering the stabilizing disc.

In the drawings like characters of reference indicate corresponding parts in the different figures.

Proceeding therefore to describe my invention in detail, reference character 10 illustrates the main beam or frame of a conventional disc type cultivator having gangs of discs 11 suspended therebehind.

Pivotally secured to the trailing end 12 of the main beam is a rudder beam 13, pivot pin 14 pivotally securing this beam transversely to the main beam 10.

A front wheel 15 may be provided upon the front or leading end 16 of this rudder beam depending upon the construction of the machine.

A rear rudder wheel assembly collectively designated 17 is provided upon the rear or trailing end 18 of the rudder beam. This rudder wheel assembly includes a support arm 19 pivotally secured by means of pivot pin 20 to the rear end 20' of the rudder beam 18. An axle 20'' extends substantially at right angles to the support member 19 and the rear rudder wheel 21 is journaled for rotation upon this axle in the conventional manner.

My device collectively designated 22 is mounted upon the rudder beam 13 and details of this mounting are shown in FIGURES 2 and 3.

An axle or spindle 23 is supported within a bearing 24 which in turn is secured to the underside 25 of the beam 13 by means of bolts 26.

This axle extends substantially at right angles to the longitudinal axis of the rudder beam 13 and is provided with an actuating arm 27 secured to and extending upwardly at right angles from one end 28 of the axle.

A stabilizing disc support arm 29 also extends from the end 28 of the axle at right angles thereto and substantially parallel with the rudder beam when the device is mounted as hereinbefore described.

This support arm 29 extends rearwardly and is provided with a disc mounting block 30 upon the distal end 31 thereof. This block is provided with a recess 32 which is adapted to receive a plate or block 33, said plate or block being pivotally secured within the recess by means of pivot pin 34'.

A disc axle 35 is secured to the plate or block 33 and the stabilizing disc 37 is secured to this axle for rotation in the conventional manner. This disc 37 is relatively thin in cross section and may be edge sharpened as at 38, as illustrated in FIGURE 6.

The disc 37, when mounted upon the axle 23, is situated substantially parallel to the longitudinal axis of the rudder beam 13 and in a vertical plane.

Means are provided to adjust the angular relationship between the disc and the beam 13, within limits, said means being shown in FIGURE 5. Screw threaded bolts 39 are engageable within screw threaded apertures within the block 30 and the ends 40 of these bolts engage the plate or block 33, but to one side of the pivot pin 34' so that by adjusting the bolts 39, and locking same in position by means of lock-nuts 41, the angular relationship of the disc may be controlled.

Formed upon the upper end of the actuating arm 27 is a pair of ears or lugs 42 and mounted between these ears or lugs is a thimble 43 comprising a hollow center section 44 and mounting pin ends 45 as shown in FIGURE 2, thus mounting the thimble pivotally between the lugs 42.

A lug 46 is formed on the member 19 of the rear rudder wheel assembly adjacent the point of pivotal connection 20' thereof to the rudder beam 13 and linkage taking the form of a rod 47 is pivotally secured by one end 48 thereof to this lug 46.

This rod is provided with a turnbuckle 49 intermediate the ends thereof for adjustment purposes and the other end 50 of this rod is mounted slidably through the hollow thimble 43.

An adjustable stop 51 is situated upon the rod between the end 48 and the thimble 43 and this stop limits the movement of the rod through the thimble in one direction.

The aforementioned end 50 of the rod 47 is screw threaded and a nut 52 engages this end. A compression spring 53 reacts between one side 54 of the thimble and the nut 52 and normally maintains the stop 51 against the thimble 43.

In operation, when the device is moving straight ahead, the rudder wheel assembly 17 is substantially in the position shown in FIGURE 1. Under these circumstances, the disc 37 engages the ground and stabilizes the operation of the machine. If the disc strikes a rock, the disc assembly rotates around the axle 23 and the thimble 43 moves along rod 47 against the pressure of spring 53 thus preventing damage occurring to the disc. When the rock or other obstruction has been passed, the spring 53 forces the actuating arm vertically and engages the disc within the ground.

However, when the machine turns to the left, the rudder wheel moves through approximately 90° in the direction of arrow 55. This causes lug 46 together with the end of the rod 47 to pass over center of the pivot 20 that the rod then moves in the direction of arrow 56. As the stop 51 is engaging the thimble 43, the actuating arm moves in the direction of arrow 57, rotating around spindle 23. This causes the mounting arm 29 to move in the direction of arrow 58 thus raising the disc 37 clear of the ground. As the machine is straightened up, the rudder wheel returns to the position shown in FIGURE 1 and the disc engages the ground for further stabilization.

FIGURE 7 shows an alternative method of raising and lowering the disc independently of the rear rudder wheel. The rod 47 is connected to an hydraulic piston and cylinder assembly 48 which in turn may be connected to the main supply of hydraulic pressure normally present upon the tractor. By a simple control within the tractor cab, the piston and cylinder assembly may be actuated thus raising and lowering the disc assembly. The piston and cylinder assembly may be mounted conveniently upon the rudder beam as desired.

What I claim as my invention is:

1. In a disc cultivator, the combination of a diagonal main frame, a gange of discs drawn by said main frame, a rudder beam pivotally connected to one end of said main frame and extending in a substantially forward and rearward direction relative to the diagonal main frame, a rudder wheel assembly pivoted to the rear end of said rudder beam for lateral swinging movement relative thereto, an arm pivotally connected to an intermediate portion of said rudder beam for raising and lowering movement in a vertical plane parallel to the rudder beam, a rotatable ground engaging stabilizing disc mounted on said arm at one side of the rudder beam, said disc being rotatable in a plane substantially parallel to the vertical plane of the rudder beam, and means connecting the rudder wheel assembly to said arm for raising and lowering said arm and the associated stabilizing disc relative to said rudder beam upon movement of said rudder wheel assembly.

2. In a disc cultivator which includes a diagonal main frame, a gang of discs drawn by said main frame, a rudder beam pivotally connected to one end of said main frame and extending in a substantially forward and rearward direction relative to the diagonal main frame, and a rudder wheel assembly pivoted to the rear end of said rudder beam for lateral swinging movement relative thereto, the combination of an arm pivotally connected to an intermediate portion of said rudder beam for raising and lowering movement in a vertical plane parallel to the rudder beam, a rotatable ground engaging stabilizing disc mounted on said arm at one side of the rudder beam, said disc being rotatable in a substantially vertical plane substantially parallel to the rudder beam, and means for raising and lowering said arm and the associated stabilizing disc relative to said rudder beam, said last mentioned means including resilient means biasing said arm downwardly.

3. The device as defined in claim 2 together with adjustable means mounting said stabilizing disc on said arm whereby the plane of rotation of said disc relative to said rudder beam may be angularly adjusted within limits in a horizontal direction.

4. The device as defined in claim 2 wherein said means for raising and lowering said arm comprises linkage operatively connecting said arm to said rudder wheel assembly whereby the arm is raised and lowered in response to lateral swinging movement of the rudder wheel assembly relative to said rudder beam.

5. The device as defined in claim 4 together with adjustable means mounting said stabilizing disc on said arm whereby the plane of rotation of said disc relative to said rudder beam may be angularly adjusted within limits in a horizontal direction.

References Cited

UNITED STATES PATENTS

| Re. 24,018 | 6/1955 | Silver et al. | 172—578 X |
|---|---|---|---|
| 708,150 | 9/1902 | Kopperud | 172—186 |
| 2,998,853 | 9/1961 | Martensen | 172—383 |
| 3,021,905 | 2/1962 | Quibell | 172—255 X |
| 3,139,941 | 7/1964 | Graham et al. | 172—130 |

ROBERT E. BAGWILL, Primary Examiner

STEPHEN C. PELLEGRINO, Assistant Examiner

U.S. Cl. X.R.

172—190, 255